United States Patent [19]

Ueda et al.

[11] 4,074,291
[45] Feb. 14, 1978

[54] SINGLE LENS REFLEX CAMERA WITH AUTOMATIC EXPOSURE CONTROL MECHANISM

[75] Inventors: Hiroshi Ueda, Nara; Akira Yoshizaki, Osaka, both of Japan

[73] Assignee: Minolta Camera Kabushiki Kaisha, Japan

[21] Appl. No.: 699,375

[22] Filed: June 24, 1976

[30] Foreign Application Priority Data

July 7, 1975  Japan .................................. 50-84811

[51] Int. Cl.² .......................... G03B 7/08; G03B 19/12
[52] U.S. Cl. ...................................... 354/51; 354/152; 354/243
[58] Field of Search ..................... 354/48, 49, 50, 51, 354/152, 232, 242, 243

[56] References Cited

U.S. PATENT DOCUMENTS

| 3,896,472 | 7/1975 | Yoshiyama et al. | 354/232 X |
| 3,911,454 | 10/1975 | Ohmori | 354/152 X |
| 3,964,076 | 6/1976 | Ichihashi et al. | 354/51 |

Primary Examiner—L. T. Hix
Assistant Examiner—M. L. Gellner
Attorney, Agent, or Firm—Watson, Cole, Grindle & Watson

[57] ABSTRACT

A single lens reflex camera in which the diaphragm aperture is stopped-down to a preset position before measuring the image light for use in the automatic exposure control mechanism of the camera. A mirror, which is provided in the camera along its optical path, is movable between a viewing position and a retracted photographing position. The camera has a focal plane shutter with two curtains. Upon exposure, the curtains travel in sequence in the same direction in which the mirror is retracted. Initiation of the movement of the first curtain begins before the mirror is fully retracted, thereby enabling the time lag between a shutter release operation and exposure to be reduced.

5 Claims, 6 Drawing Figures

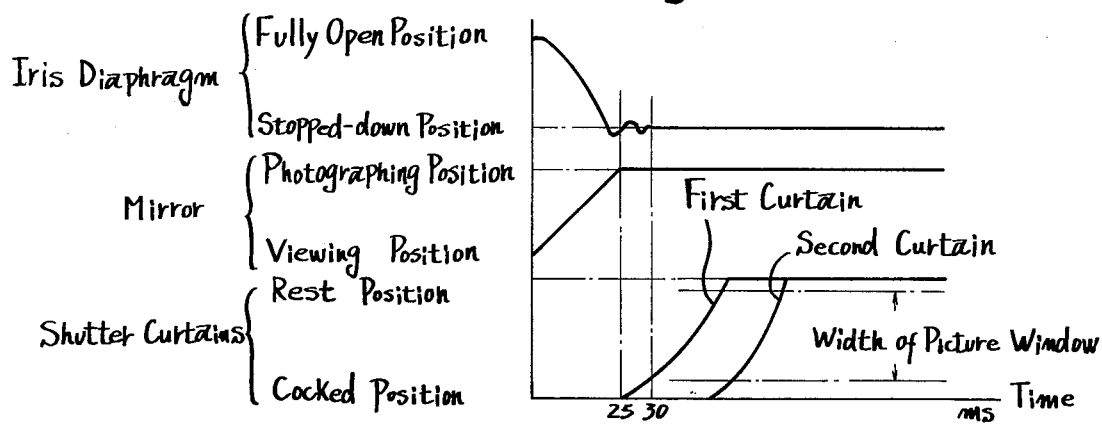
Fig.1 (PRIOR ART)
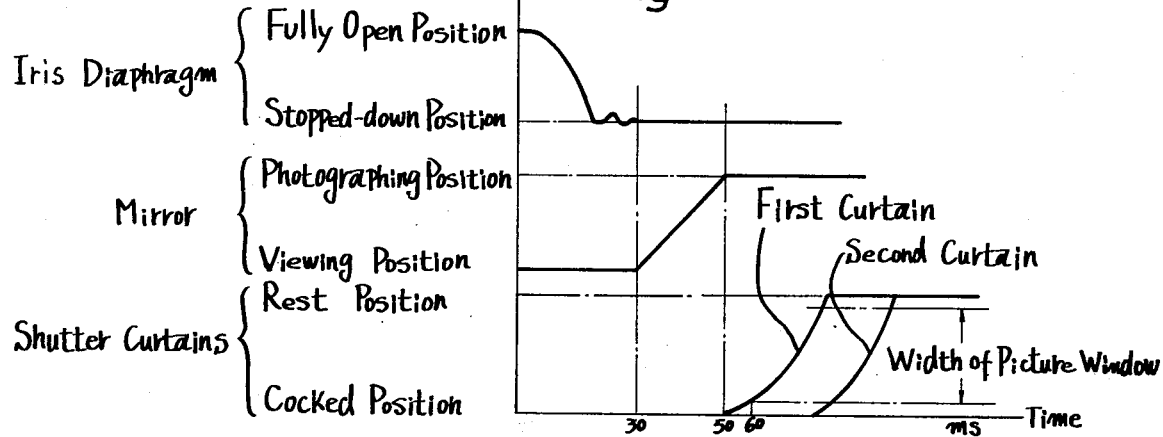
Fig.2 (PRIOR ART)
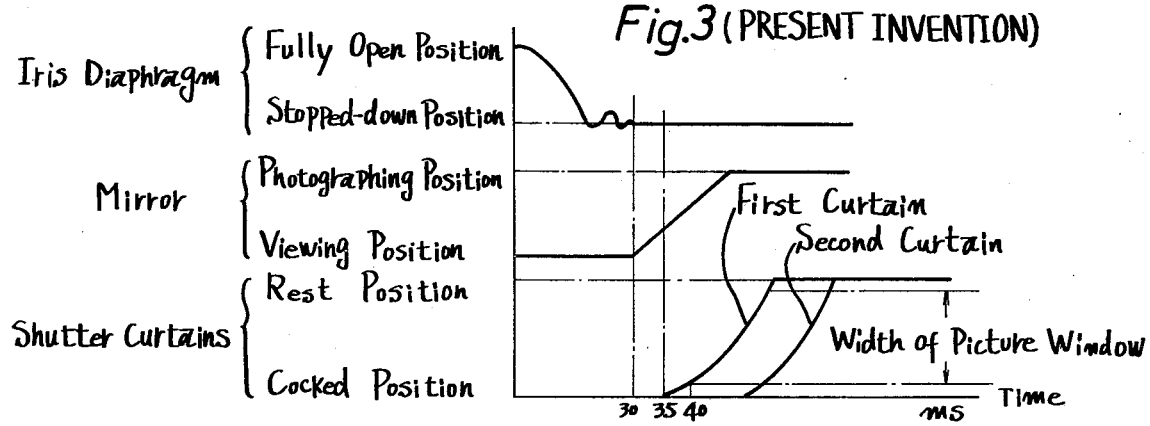
Fig.3 (PRESENT INVENTION)

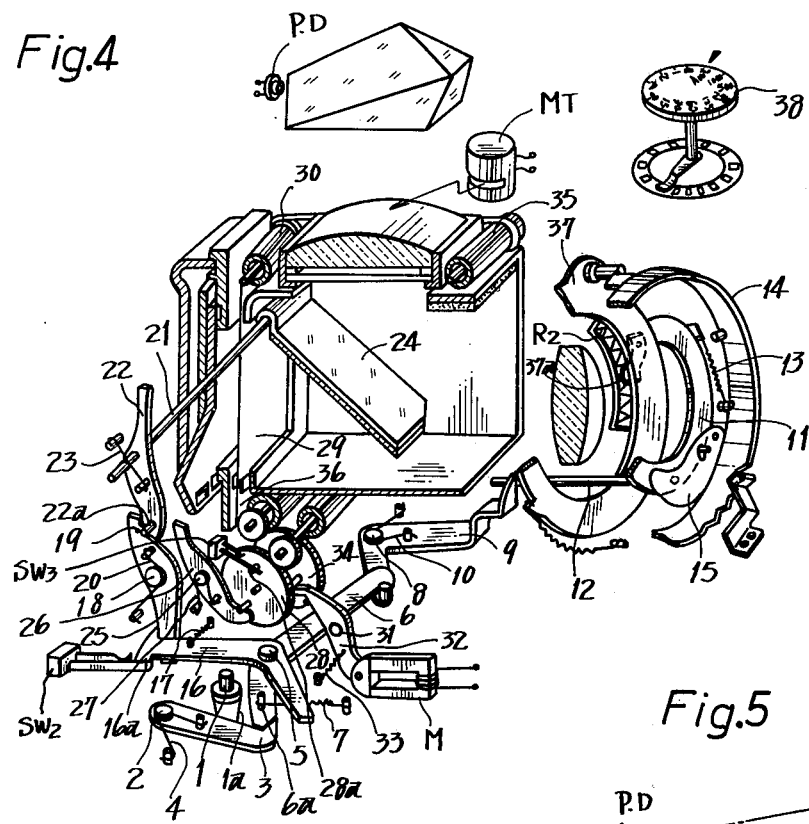
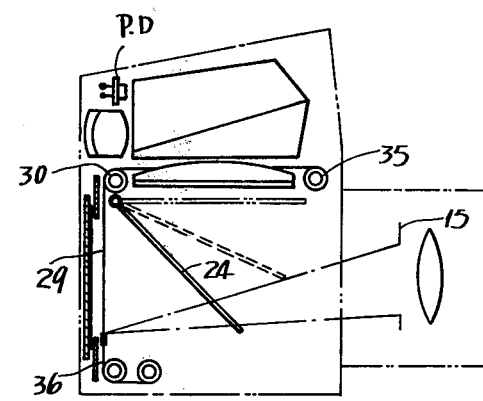
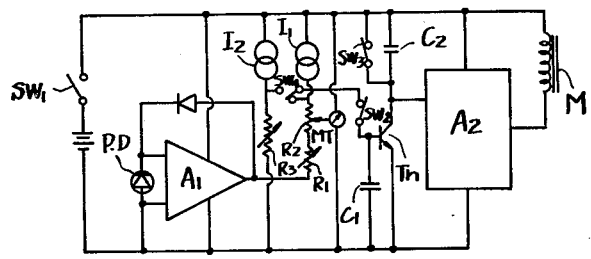

SINGLE LENS REFLEX CAMERA WITH AUTOMATIC EXPOSURE CONTROL MECHANISM

BACKGROUND OF THE INVENTION

The present invention relates to a single lens reflex camera with an automatic exposure control device.

In a camera of this type, the diaphragm is first stopped down upon actuation of a shutter release operation and then the light passing through the stopped-down diaphragm aperture is measured and stored. Subsequent to storing a signal indicative of the measured light, a movable mirror is retracted from its viewing position along the optical path of the camera. Exposure is then effectuated for a duration depending on the amount of light measured and stored.

With such a single lens reflex camera, accurate automatic exposure-time control cannot be attained, unless the light passing through the diaphragm aperture is measured and stored after movement of the diaphragm has been stabilized following the stopping-down operation. The light which is measured and stored is that transmitted through or reflected off the mirror at its viewing position. For this reason, it is not possible to simultaneously initiate movement of the movable mirror from its viewing position to its retracted position and the stopping-down of the diaphragm aperture. Such simultaneous initiation which can be obtained with a full aperture TTL light-measuring type camera is represented by the time chart shown in FIG. 1.

With the camera of concern in the present invention, however, movement of the mirror has to be effected after the diaphragm has been completely stopped down. In the previously known systems, the direction in which the focal plane shutter travels upon exposure is generally different from the direction of movement of the mirror to its retracted position, e.g., mirror is retracted upwardly while the shutter curtain travels from left to right. Accordingly, exposure is not effected during the lapse of time from the commencement of the retracting movement of the movable mirror from the picture-taking optical path until termination of such a movement, as represented in the time chart shown in FIG. 2. As shown in FIGS. 1 and 2, movement of the first curtain is controlled to start after arrival of the mirror at the retracted or photographing position. It has long been recognized that with such systems the exposure can only be commenced when the optical path is free of any interruption. Thus, with the prior art type of camera, there is a considerable time lag from the time when the shutter is released until a picture is actually taken. Such a long time lag occasionally results in production of a picture far from the photographer's expectation.

In this type of camera, light can be measured in two different ways, i.e., with the aperture at a fully-open position or at a stopped-down position, as previously noted.

i. Fully-open aperture light measurement (FIG. 1)

Light is measured and stored with the diaphragm aperture fully open. In utilizing this type of measurement, it is possible to drive the mirror to the photographing position simultaneously with the stopping-down operation because the storage of the light measuring output has been already completed.

ii. Stopped-down aperture light measurement (FIG. 2)

Light is measured and stored after the stopping-down operation. In utilizing this type of measurement, the mirror has to be maintained at the viewing position until storage of the light measuring output is completed.

The following table shows the advantages and disadvantages for fully-open aperture and stopped-down aperture light measurements.

|  | Fully-open aperture measurement | Stopped-down aperture measurement |
|---|---|---|
| Advantages | Less delay of actual exposure from the shutter release operation | Light is measured through the stopped-down aperture through which the film is actually exposed |
|  |  | No need for any compensation |
| Disadvantages | Light is measured through the fully-open aperture, while the film is exposed through the stopped-down aperture | Greater delay of actual exposure from the shutter release operation |
|  | Compensation based on the difference between the fully-open aperture and the preset aperture is necessary for controlling the exposure time |  |

SUMMARY OF THE INVENTION

An object of the present invention is to provide a single lens reflex camera with an automatic exposure control device, wherein the time lag between the shutter release operation and the exposure operation is reduced.

In order to obtain this objective there is provided in accordance with the present invention a single lens reflex camera with an automatic exposure control device in which, upon exposure, the focal plane shutter travels in the same direction as the movement of the mirror ot its retracted position. In the course of the movement of the mirror to its retracted position, movement of a first curtain of the focal plane shutter is initiated for commencing exposure (see the time chart of FIG. 3).

Thus, the mirror is not completely retracted from the viewing position prior to exposure but instead is gradually retracted in one directon while increasing the part of the picture window along the optical path open for receiving light. During such operation, the focal plane shutter does not simultaneously expose the whole area of the film in the picture window but starts to expose the film along one edge of the picture window.

Since upon exposure the first curtain of the shutter starts travelling in the path of the movement of the mirror to its retracted position, the time lag from the shutter release until commencement of exposure is greatly reduced as compared to the operation of previously known systems. For instance, assuming that the duration necessary for stopping down the aperture is 30ms, the duration for retracting the mirror is 25 ms and the duration from the commencement of travel of the first curtain until the commencement of exposure is 5ms, as shown in the time chart of FIG. 2, in the cameras of the prior art there is a time lag of 60ms. As seen in the time chart of FIG. 3, in accordance with the present invention the time lag is decreased to 40ms.

BRIEF DESCRIPTION OF THE DRAWINGS

FIGS. 1, 2 and 3 are time charts showing the time sequence of the movements of the diaphragm, movable mirror, and shutter of a fully-open aperture TTL light-measuring camera of the prior art, stopped-down aperture light-measuring camera of the prior art, and a camera according to the present invention, respectively.

FIG. 4 is an exploded, perspective view of a camera according to the present invention.

FIG. 5 is a cross-sectional diagram of the essential parts of the camera of FIG. 4.

FIG. 6 is a block diagram of an electric circuit utilized in the camera of FIG. 4.

DESCRIPTION OF THE PREFERRED EMBODIMENT

The essential parts of the camera of the present invention are illustrated in FIG. 4. As can be seen from this figure, if a shutter button coupled to a release member 1 is depressed, then a locking member 3 pivotally supported on a shaft 2 in the body of a camera is urged by a tapered portion 1a of release member 1 in the clockwise direction against the force of a spring 4. Movement of locking member 3 permits an operating member 6 to rotate in the counterclockwise directon under the action of a spring 7. Operating member 6 is pivotally supported on a shaft 5 in the body of the camera. Upon rotation of operating member 6, a diaphragm operating member 9 pivotally supported on a shaft 8 in the body proper of the camera is urged in the clockwise direction under the action of a spring 10. As a result, a diaphragm-interlocked pin 12 provided on a diaphragm operating ring 11 is free to move following the movement of diaphragm operating member 9. Operating ring 11 is thus rotated in the clockwise direction under the action of a spring 13 to thereby stop down diaphragm blades 15 to an aperture value determined by a diaphragm-aperture presetting ring 14.

Even after diaphragm blades 15 have been set to the preset aperture, operating member 6 continues to rotate, so that a pin 6a rigidly secured on operating member 6 is brought into engagement with a locking member 16 pivotally supported on shaft 5, thereby urging locking member 16 in the counterclockwise direction against the force of a spring 17. Due to the urging of locking member 16 in the counterclockwise direction, a memory switch SW2 maintained in its on-position is turned off by a bent portion 16a of locking member 16. Switch SW2 causes a memory capacitor to store a signal indicative of the amount of light measured by a light receiving photo-diode PD which receives light from a photographic object through the stopped-down diaphragm aperture. Subsequently, a mirror actuating member 19 pivotally supported on a shaft 18 in the camera body is released from its locked position due to rotation of locking member 16 in the counterclockwise direction. Thus, mirror actuating member 19 is urged in the clockwise direction under the action of a spring 20, thereby pushing a pin 22a on a mirror controlling member 22 which is rigidly mounted on a mirror rotating shaft 21. Mirror controlling member 22 is thus rotated in the counterclockwise direction against the force of a spring 23.

In the course of counterclockwise rotation of mirror controlling member 22 and in the course of movement of the mirror from the picture-taking optical path to its retracted position, pin 22a urges a first curtain locking member 26 in the clockwise direction against the force of a spring 27. First curtain locking member 26 is pivotally supported on a shaft 25 in a camera body. Thus, a first curtain gear 28 is released from its locked position, whereby a first curtain 29 of the shutter is caused to travel upwardly by a forward curtain driving drum 30 thereby opening the shutter. Due to the rotation of forward curtain gear 28, a trigger switch SW3 maintained in its closed position by a pin 28a on gear 28 is opened. Opening of switch SW3 initiates the counting of the exposure time. After trigger switch SW3 has been opened, an integrating capacitor is charged by an electric current corresponding to the level of voltage charged in the memory capacitor. When the charge level in the integrating capacitor reaches a given value, an electromagnet M which is generally excited becomes deenergized. In turn a second curtain locking member 32 pivotally supported on a shaft 31 in the camera body is urged in the clockwise direction under the action of a spring 33, thereby releasing a second curtain gear 34 from its locking position. A second curtain 36 is then caused to travel upwardly due to rotation of a second curtain driving drum 35 thereby closing the shutter.

After completion of the exposure operation, operating member 6 is urged in the clockwise direction against the force of spring 7 by a mirror-returning member (not shown) which is adapted to be released from its locked position in response to second-curtain-travel-determination signals, whereby diaphragm actuating member 9 is urged in the counterclockwise direction. As a result, diaphragm actuating member 9 urges diaphragm-interlocked pin 12 to rotate diaphragm ring 11 in the counterclockwise direction, whereby the diaphragm is returned to its fully open position. Simultaneously with the above movement, the mirror-returning member rotates mirror actuating member 19 in the counterclockwise direction against the force of spring 20. Mirror 24 is thus rotated in the clockwise direction and returned from its retracted position to its viewing position in which position it is orientated an angle of 45° with a film plane.

Due to a shutter cocking operation, the mirror-returning member is locked in the viewing position, and at the same time, first curtain gear 28 and second curtain gear 34 are both rotated in the clockwise direction, thereby simultaneously moving the first curtain 29 as well as the second curtain 36 in a downward direction. Both curtains are thus returned to their cocked positions. First curtain 28 is again locked in its cocked position by first curtain locking member 26.

A cross-sectional diagram of the essential parts of the camera of FIG. 4 is presented in FIG. 5. Exposure is effected by first curtain 29 of a focal plane shutter which travels upwardly, Thus, exposure to light, of a frame of film at its lower portion, followed by the exposure of the upper portion of the film, as first curtain 29 continues upwardly. This enables the first curtain to commence travelling at the time when mirror 24 has assumed a position shown by a broken line in the course of its upward movement to its retracted position, at which position mirror 24 no longer interferes with the exposure of the lower portion of the film frame. Since the direction in which the mirror is retracted is the same as that of the moving first curtain, the portion of the film being exposed will spread in such a fashion as to follow the movement of the mirror to its retracted position, leaving no risk of the exposure light being hindered by the mirror.

In FIG. 6, there is shown a diagram of an electric circuit for use in the camera of the present invention. The circuit includes: potential source switch SW1; photodiode PD which is the light receiving element; differential amplifier A1; a sliding resistor R1 for film speed setting; and a sliding resistor R2 for a preset-aperture-value information, whose resistance varies according to the preset value of the diaphragm aperture by means of a contacting piece 37a provided on a coupler ring 37. The resistance of a sliding resistor R3 can be varied in response to a shutter speed manually set by using a shutter speed setting dial 38. A switch SW4 is also provided for changing over from the automatic to manual shutter speeds; switch SW4 is shown with shutter speed dial 38 set to an automatic position. If shutter speed dial 38 is set to a manual-shutter-speed-setting position, then the contact of switch SW4 will be changed over. I1 and I2 are sources for constant currents and MT is a meter for indicating the proper shutter speed within the view finder. Further provided in the circuit are a memory capacitor C1, an integrating capacitor C2, trigger switch SW3, a memory switch SW2, a switching circuit A2, an antilogarithmically converting transistor Tr1, and electromagnet M.

In the illustrated embodiment, the opening of the diaphragm aperture is determined by rotating diaphragm actuating ring 11 to a point preset by preset ring 14. The present invention, however, is not limited to such an arrangement. The present invention may also be applied to an instantaneously stopping-down, light-measuring, exposure-time-automatic controlling, single lens reflex camera having a mechanism for automatically setting the opening of the diaphragm aperture. In this latter type of camera, the stopping-down operation of the diaphragm to its closed position initiated by the shutter release operation is interrupted by means of an electromagnet adapted to be controlled by a light measuring circuit, thereby setting the opening of the diaphragm aperture.

It is noted that the above description and the accompanying drawings are provided merely to present an exemplary embodiment of the present invention and that additional modifications of such embodiments are possible within the scope of this invention without deviating from the spirit thereof.

We claim:

1. A single lens reflex camera comprising:
   a mirror movable between a viewing position in which it projects into the optical path of the camera and a photographing position in which it is retracted from the optical path;
   a focal plane shutter having first and second curtains which travel upon exposure in the same direction in which said mirror is retracted from said viewing position to said photographing position; and,
   means for initiating the travel of said first curtain when said mirror is partially retracted from the optical path.

2. A single lens reflex camera having an automatic exposure control mechanism comprising:
   a diaphragm aperture capable of being stopped down to a preset position;
   means for initiating the stopping down operation of said diaphragm in response to a shutter release operation;
   a mirror movable between a viewing position in which it projects into the optical path of the camera and a photographing position in which it is retracted from the optical path;
   means for storing a signal indicative of light received through the lens of the camera after said diaphragm aperture has been stopped down;
   means for driving said mirror from said viewing position to said photographing position after a signal has been stored in said storing means;
   a focal plane shutter having first and second curtains which travel upon actuation of an exposure operation in the same direction in which said mirror is retracted from said viewing position to said photographing position;
   means for initiating movement of said first curtain for causing exposure when said mirror is partially retracted from the optical path during the movement from said viewing position to said photographing position; and,
   means for controlling the delayed time for initiating movement of said second curtain in dependence upon the signal stored in said storing means.

3. A single lens reflex camera having an automatic exposure control mechanism comprising:
   a diaphragm aperture capable of being stopped down;
   means for determining the position to which said diaphragm aperture is to be stopped down;
   means for initiating the stopping-down operation of said diaphragm aperture in response to a sutter release operation;
   a mirror movable between a viewing position in which it projects into the optical path of the camera and a photographing position in which it is retracted from the optical path;
   means for measuring light that passes through said diaphragm aperture and is transmitted to said measuring means by way of said mirror in said viewing position;
   means for storing the output of said light measuring means after said diaphragm aperture has been stopped down;
   means for driving said mirror from said viewing position to said photographing position after the output of the light measuring means has been stored in said storing means;
   a focal plane shutter having first and second curtains which travel upon actuation of an exposure operation in the same direction in which said mirror is retracted from said viewing position to said photographing position;
   means for initiating movement of said first curtain for causing an exposure when said mirror is partially retracted from the optical path during the movement from said viewing position to said photographing position; and,
   means for controlling the time delay after which movement of said second curtain is initiated in response to the output stored in said storing means.

4. A camera as defined in claim 3 further comprising a rectangular picture window located at the focal plane along said optical path; and wherein said means for initiating movement of said first curtain initiates such movement before arrival of said mirror at said photographing position but after initiation of the retraction of said mirror from the optical path of light to be projected on one edge of said picture window which is first exposed upon initiation of movement of said first curtain.

5. A camera as defined in claim 4 wherein said mirror is retracted upwardly and said first and second curtains travel upwardly upon exposure.

* * * * *